(12) United States Patent
Peng

(10) Patent No.: US 8,949,648 B2
(45) Date of Patent: Feb. 3, 2015

(54) SYSTEM AND METHOD TO OVERCOME WANDER ACCUMULATION TO ACHIEVE PRECISION CLOCK DISTRIBUTION OVER LARGE NETWORKS

(75) Inventor: Mengkang Peng, Surrey (GB)

(73) Assignee: Semtech Corp., Camarillo, CA (US)

( * ) Notice: Subject to any disclaimer, the term of this patent is extended or adjusted under 35 U.S.C. 154(b) by 793 days.

(21) Appl. No.: 13/151,872

(22) Filed: Jun. 2, 2011

(65) Prior Publication Data

US 2012/0263264 A1    Oct. 18, 2012

Related U.S. Application Data

(60) Provisional application No. 61/475,080, filed on Apr. 13, 2011.

(51) Int. Cl.
*G06F 1/12* (2006.01)
*G06F 1/10* (2006.01)
*H04L 7/00* (2006.01)
*H04J 3/06* (2006.01)

(52) U.S. Cl.
CPC ............ *H04J 3/0673* (2013.01); *H04J 3/0635* (2013.01); *G06F 1/12* (2013.01); *H04L 7/0012* (2013.01)
USPC ............................ 713/400; 713/503; 713/600

(58) Field of Classification Search
CPC ............... G06F 1/04; G06F 1/06; G06F 1/10; G06F 1/12; G06F 1/14; G06F 2011/00; H04L 1/00; H04L 7/0008; H04L 7/0012; H04L 7/0016; H04L 7/0025; H04L 7/0037; H04L 2/0032; H04J 3/0635; H04J 3/0658; H04J 3/0673
USPC ................. 713/400–401, 500–503, 600–601
See application file for complete search history.

(56) References Cited

U.S. PATENT DOCUMENTS

| | | | | |
|---|---|---|---|---|
| 6,943,610 | B2* | 9/2005 | Saint-Laurent | 327/295 |
| 7,372,846 | B2* | 5/2008 | Zwack | 370/352 |
| 7,768,931 | B2* | 8/2010 | Golparian | 370/252 |
| 8,259,758 | B2* | 9/2012 | Chen et al. | 370/503 |
| 2003/0041274 | A1* | 2/2003 | Platteter et al. | 713/400 |
| 2006/0080575 | A1* | 4/2006 | Golparian | 714/12 |
| 2009/0222589 | A1* | 9/2009 | Kirsch et al. | 709/248 |
| 2010/0220748 | A1* | 9/2010 | Inomata | 370/503 |

* cited by examiner

*Primary Examiner* — Fahmida Rahman
(74) *Attorney, Agent, or Firm* — Fitzsimmons IP Law

(57) ABSTRACT

A system and method for synchronizing clocks across a packet-switched network eliminates wander accumulation to enable precision clock distribution across a large network. In addition to standard Precision Time Protocol (PTP) synchronization messages or similar time synchronization messages, each clock regenerator stage receives a grand clock error message from the previous stage, updates this error message with its own stage clock error, and then transmits the updated grand clock error to the next stage. This enables the synchronization algorithm to compensate for the error of the previous stage, effectively locking each clock regenerator stage to the grand master clock directly.

19 Claims, 3 Drawing Sheets

SYSTEM AND METHOD TO OVERCOME WANDER ACCUMULATION TO ACHIEVE PRECISION CLOCK DISTRIBUTION OVER LARGE NETWORKS

RELATED APPLICATIONS DATA

This application claims priority pursuant to 35 U.S.C. §119 (e) to U.S. provisional patent application Ser. No. 61/475,080 filed Apr. 13, 2011, the subject matter of which is incorporated by reference herein in its entirety.

BACKGROUND OF THE INVENTION

1. Field of the Invention

The present invention relates generally to the field of distributing clocks over a packet-switched network. More particularly, it relates to a system and method for overcoming wander accumulation, such that clock signals can be distributed across a large network with high precision.

2. Description of Related Art

Synchronizing the elements that comprise a network is fundamentally important to achieving good network performance. This is especially true for telecommunication systems and control systems that require all nodes and users to maintain good synchronization with one another. As more systems become Internet-Protocol (IP) based, the need for high-precision time distribution only increases.

In general, synchronizing clocks over a network requires distributing timing information from a master clock to a number of slave clocks throughout the network. However, variable latencies and traffic-dependent delays make such distribution schemes challenging in the context of packet-based networks. Thus, the Precision Time Protocol (PTP) IEEE-1588 standard has emerged as one way to address many of the concerns associated with packet-based time synchronization of network elements. PTP addresses the time-transfer latency that arises as time-packet and data-packet traffic moves through the hubs, switches, cables and other hardware that makes up the network.

PTP operates using a master-slave concept. The master is equipped with a high-precision clock, such as an atomic clock. The master and slave devices exchange data packets that enable the slave device to lock to the master clock reference. For example, FIG. 1 describes the basic PTP packet exchange process for transferring timing information. The master unit 102 sends out a Synchronization message 106 on a regular interval. The slave device 104 receives the time-stamped Synchronization message 106 and may immediately send back a Delay_Request packet 108 to the master 102. The master then responds with a Delay_Response packet 110. This exchange repeats, with the master unit 102 sending out Synchronization messages 112, 114, which are followed by corresponding Delay_Request and Delay_Response packets. Receipt of the Synchronization message allows the slave to align its local timebase to the frequency of the master clock, and the additional Delay_Request and Delay_Response packets allow the slave to further align its local clock phase to the master clock, for complete synchronization. Other methods of synchronization are also used in the art, such as Network Time Protocol (NTP) version 4. While the implementation details differ from PTP, NTP also relies on the exchange of timing messages from master to slave and from slave to master to achieve synchronization.

A slave clock locked to a master clock, as described above, is known as an ordinary clock. The PTP protocol also defines a boundary clock. A boundary clock functions as an ordinary clock but in addition also serves as a master clock to other downstream ordinary or boundary clocks. A chain of such boundary clocks thus provides a way to distribute the grand master clock reference across a very large network. For example, FIG. 2 illustrates a grand master clock 202 networked with four boundary clocks, 204, 206, 208, and 210. The grand master clock 202 and the first boundary clock 204 exchange PTP packets 212 in order to phase lock the first boundary clock 204 to the master clock 202. Boundary clock 206 is locked to boundary clock 204 via PTP packet exchange 214 in the same manner. The third and fourth boundary clocks, 208 and 210, are locked to the preceding boundary clock by the exchange of PTP packets 216 and 218, in the same way. The last boundary clock 210 is thus locked to the grand master clock 202 via all the intermediate boundary clocks.

This method could work well for some applications where the number of boundary clocks in the chain is very small, but for many others, it does not achieve sufficient precision. The problem with this architecture is that each boundary clock introduces a certain amount of clock error. The error introduced by each boundary clock is passed along to the next one in the chain such that the overall error continues to grow. For clocks late in the distribution chain, the error may grow to an unacceptable magnitude. This problem is especially acute for very large networks that may include many boundary clock stages. Accordingly, it would be advantageous to provide a system and method for eliminating the accumulation of boundary clock error to enable precision clock distribution over large sized networks.

SUMMARY OF THE INVENTION

The invention is directed to a system and method for synchronizing clock regenerators in order to overcome wander accumulation. An example of a clock regenerator is a boundary clock in a packet-switched internet-protocol network. However, the system and method are equally applicable to telecommunication networks, and any other types of networks that require precision time distribution.

An embodiment of a clock synchronization system for use in a network in accordance with the present invention includes a grand master clock having a precision timing source and at least a first and second clock regenerator. The first clock regenerator is coupled to the grand master clock and includes a first local clock and a first synchronization processing unit for synchronizing the first local clock to the grand master clock. The first synchronization processing unit is configured to receive a master-to-slave message from the grand master clock and to send a slave-to-master message back to the master clock. The synchronization processing unit uses these messages to calculate a first master-to-slave path delay and a first slave-to-master path delay. The first synchronization processing unit is further configured to calculate a first stage clock error equal to one half of the difference between the first slave-to-master path delay and the first master-to-slave path delay. The first synchronization processing unit is further configured to calculate a first grand clock error that is the sum of the first stage clock error and the grand clock baseline error. The grand clock baseline error is defined to be zero. In some embodiments, the grand master clock is configured to send the grand clock baseline error to the first clock regenerator. But in other embodiments, the grand clock baseline error is generated by the first clock regenerator itself. The first synchronization processing unit is further configured to synchronize the first local clock to the grand master clock using the first stage clock error and the grand clock baseline error.

It should be appreciated that while synchronization messages and delay response messages are discussed with reference to the PTP protocol, the invention is not limited to systems that implement this standard. The synchronization and delay response messages discussed herein are intended to encompass other message formats and protocols that achieve synchronization in a similar manner. For example, the system and methods described herein apply equally to similar protocols and mechanisms for time synchronization, such as the "network time protocol" (NTP) version 4 and other similar methods.

The embodiment further includes a second clock regenerator that is operatively coupled to the first clock regenerator and that includes a second local clock and a second synchronization processing unit. The second synchronization processing unit is configured to receive a synchronization message and a delay response message from the first clock regenerator. It is further configured to receive the first grand clock error from the first clock regenerator. The second synchronization processing unit is further configured to calculate a second stage clock error based on the information from synchronization and delay response messages. It is further configured to synchronize the second local clock to the grand master clock based at least in part on the second stage clock error and the first grand clock error.

In some embodiments, grand clock error needs to be quantized for storage inside the clock regenerator and for passing between different clock regenerators. The grand clock error may be quantized to 64 bits, to 32 bits, or fewer, in order to conserve system resources while preserving its precision at a certain level. In other embodiments, each grand clock error may be packaged with one of the existing PTP messages, such as the Delay_Response message, in the scope of the TLV extension defined in the PTP standard, sent to the next clock regenerator stage such that they are sent together as part of a single message.

In some embodiments, the processing element within a clock regenerator stage includes a rate control unit. The rate control unit selectively controls a frequency at which the grand clock error calculated at that clock regenerator stage is transmitted to the next clock regenerator. The rate at which the grand clock error is transmitted may be a fixed rate or a variable rate.

In another embodiment, the processing element within a clock regenerator stage further includes a time-out unit. The time-out unit is configured to include a memory for storing the grand clock error received from the previous stage, and a time-out counter. The time-out counter is reset to an initial value each time a grand clock error is received from the previous stage. The time-out counter then counts down from the initial value at a fixed rate. The grand clock error saved in the memory will be used for synchronizing that clock regenerator stage as long as the time-out counter has not yet reached zero. In other words, the time-out unit ensures that the clock regenerator is using a grand clock error signal that is not older than a particular configurable time.

An embodiment of a method for synchronizing a grand master clock and N clock regenerators in a network in accordance with the present invention, where N is an integer greater than 1, includes the steps described below. The method comprises sending a synchronization message from the grand master clock to a first clock regenerator and sending a delay response message from the grand master clock to the first clock regenerator. At the first clock regenerator, the method includes calculating a first master-to-slave path delay based at least in part on the synchronization message; calculating a first slave-to-master path delay based at least in part on the delay response message; calculating a first stage clock error equal to one half of a difference between the first slave-to-master path delay and the first master-to-slave path delay; generating a first grand clock error equal to a sum of the first stage clock error and a grand clock baseline error, wherein the grand clock baseline error is set equal to zero; and synchronizing the first clock regenerator to the grand master clock based at least in part on the first stage clock error and the grand clock baseline error.

A similar process is followed at each clock regenerator stage. For example, at a kth clock regenerator, where k is an integer between 1 and N, the method comprises the following: receiving a synchronization message from the (k−1)th clock regenerator; receiving a delay response message from the (k−1)th clock regenerator; receiving a (k−1)th grand clock error from the (k−1)th clock regenerator; calculating a kth master-to-slave path delay based at least in part on the synchronization message from the (k−1)th clock regenerator; calculating a kth slave-to-master path delay based at least in part on the delay response message from the (k−1)th clock regenerator; calculating a kth stage clock error equal to one half of a difference between the kth slave-to-master path delay and the kth master-to-slave path delay; calculating a kth grand clock error equal to a sum of the kth stage clock error and the (k−1)th grand clock error; and synchronizing the kth clock regenerator to the grand master clock based at least in part on the kth stage clock error and the (k−1)th grand clock error.

And finally, at the Nth (last) clock regenerator, the method comprises: receiving a synchronization message from the (N−1)th clock regenerator; receiving a delay response message from the (N−1)th clock regenerator; receiving an (N−1)th grand clock error from the (N−1)th clock regenerator; calculating an Nth master-to-slave path delay based at least in part on the synchronization message from the (N−1)th clock regenerator; calculating an Nth slave-to-master path delay based at least in part on the delay response message from the (N−1)th clock regenerator; calculating a Nth stage clock error equal to one half of a difference between the Nth slave-to-master path delay and the Nth master-to-slave path delay; and synchronizing the Nth clock regenerator to the grand master clock based at least in part on the Nth stage clock error and the (N−1)th grand clock error. This method enables each of the N clock regenerators to be synchronized directly to the grand master clock.

Other embodiments of a method of synchronizing a grand master clock and N clock regenerators in accordance with the present invention may include configuring the grand master clock to generate the grand clock baseline error and to send it to the first clock regenerator. Different embodiments may include the step of generating the grand clock baseline error at the first clock regenerator. And some embodiments may include the step of quantizing the grand clock error at each clock regenerator to 32 bits or fewer in order to conserve system resources.

Other embodiments and applications in accordance with the present invention will also become clear by studying the following detailed description of the preferred embodiment and the attached sheets of drawings, which will first be described briefly.

DETAILED DESCRIPTION OF THE PREFERRED EMBODIMENT

The invention provides an apparatus and method for eliminating wander accumulation in a network in order to enable precision clock distribution across a large network. Unlike a standard PTP network in which each boundary clock is synchronized directly to the preceding boundary clock and therefore indirectly to the grand master clock, an embodiment of a network according to the present invention effectively synchronizes each clock regenerator directly to the grand master reference itself by distributing an additional error signal through the network.

Figure 1:
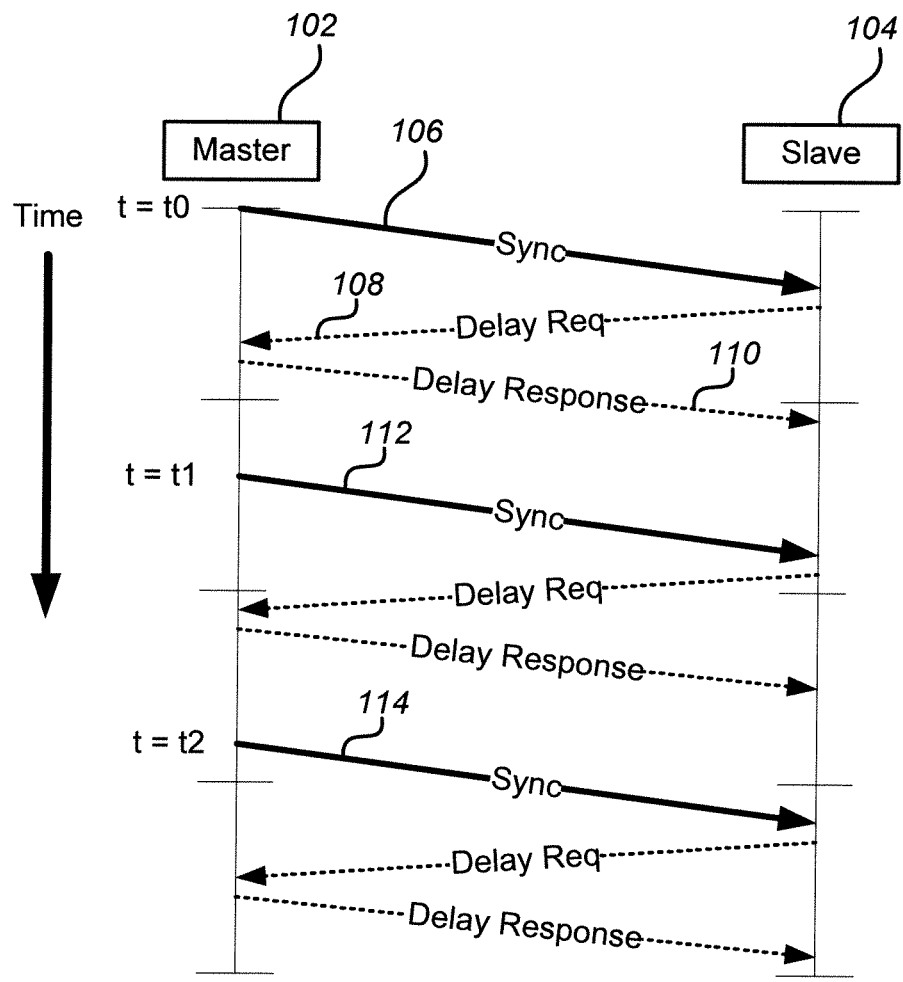
FIG. 1 depicts a typical exchange of synchronization packets between a master and slave node in an implementation of the PTP protocol.
Figure 2:
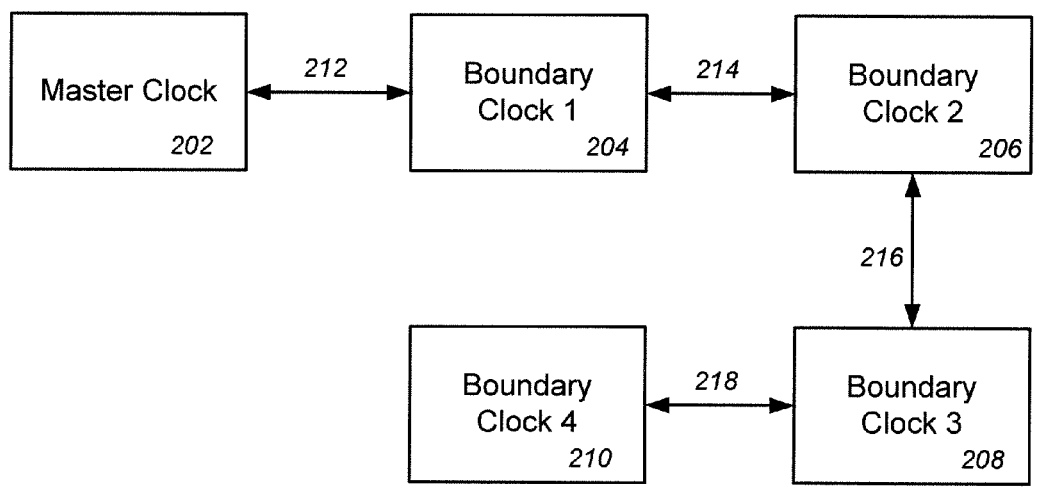
FIG. 2 is a block diagram depicting the synchronization of several clock regenerators to a master clock according to a typical implementation of the PTP protocol.
Figure 3:
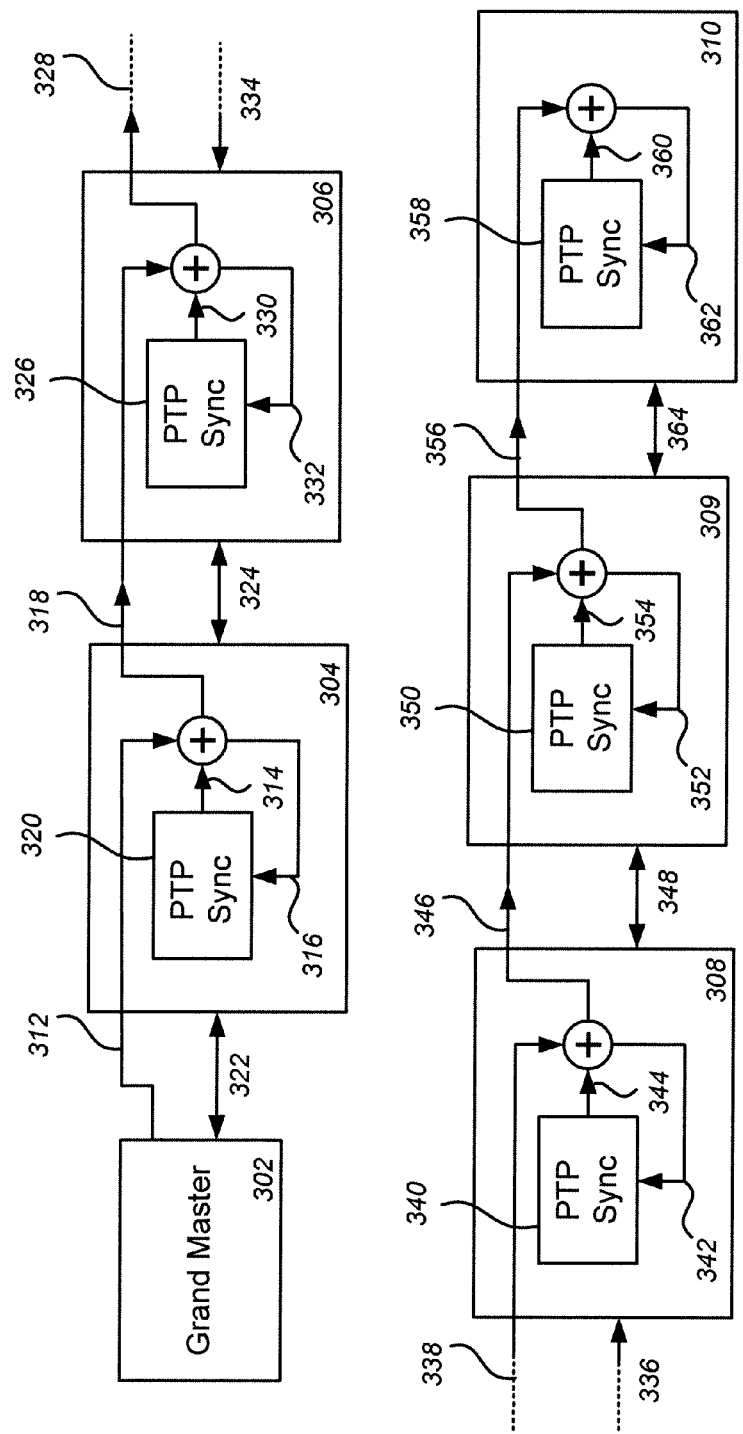
FIG. 3 is a block diagram of an embodiment of a clock synchronization system in accordance with the present invention.

FIG. 3 is a block diagram of a clock synchronization system in accordance with an embodiment of the present invention. While this embodiment is described with reference to a PTP network including boundary clocks, it is generally applicable to other types of networks that includes clock regenerators to be synchronized to a grand master clock reference. The grand master clock 302 includes the primary precision timing source to which the network is synchronized. The first boundary clock 304 is locked to the grand master clock 302 using a normal PTP slave synchronization algorithm 320 and the exchange of standard PTP packets 322. The other boundary clocks (e.g., 306, 308, 309, 310) are also locked to the grand master clock 302 using a normal PTP slave synchronization algorithm (e.g., 326, 340, 350, 358) and the exchange of standard PTP packets (e.g., 324, 334, 336, 348, 364). The first boundary clock 304 calculates its clock error against the immediately preceding clock (in this case the grand master) and generates its "stage clock error" 314. The other boundary clocks (e.g., 306, 308, 309, 310) also calculate clock errors and generate "stage clock errors" (e.g., 330, 344, 354, 360). In a standard PTP implementation, the stage clock error of the first boundary clock 304 would be used directly to drive the phase locked loop of the first boundary clock. However, in this case, the first boundary clock 304 also receives an additional "grand clock error" signal 312. This grand clock error signal is summed with the stage clock error 314 to produce a combined clock error to drive the phase locked loop at 316, and the sum is also passed along as an updated grand clock error signal 318 to the next boundary clock 306. The grand clock error 318 that is fed to the next boundary clock 306 thus includes a measure of boundary clock 304's error with respect to the grand master. In the other boundary clocks (e.g., 306, 308, 309, 310), the combined clock error signals (e.g., 318, 328, 338, 346, 358) are also summed with a corresponding stage clock error (e.g. 330, 344, 354, 360), and are used to drive corresponding phase locked loops (e.g., 332, 342, 352, 362). The sums are also passed along as updated grand clock error signals (e.g., 328, 338, 346, 356).

By definition, the grand clock baseline error signal 312 is assigned a fixed value of zero, since it comes from the grand master 302. Each subsequent boundary clock (e.g., 304, 305, 308, 309, 310) receives both the standard PTP packets (e.g., 322, 324, 334, 336, 348, 364) and a grand clock error signal (e.g., 312, 318, 328, 338, 346, 356) that effectively represents any error introduced by the preceding stage. For example, boundary clock i 309 exchanges PTP packets 348 with boundary clock i-1 308 and receives the grand clock error signal 346 from boundary clock i-1. Mathematically, the process can be described as follows:

$$\text{GrandClockError}(0)=0; \quad (1)$$

$$\text{StageClockError}(i)=(s2m\text{Delay}(i)-m2s\text{Delay}(i))/2; \quad (2)$$

$$\text{GrandClockError}(i)=\text{GrandClockError}(i-1)+\text{StageClockError}(i). \quad (3)$$

Here, GrandClockError(i-1) is the grand clock error received by the ith boundary clock, and GrandClockError(i) is the updated grand clock error signal sent out by the ith boundary clock. StageClockError(i) is the stage clock error of the ith boundary clock. s2mDelay(i) is the slave-to-master path delay obtained from the normal "Delay_Response" message, and m2sDelay(i) is the master-to-slave path delay obtained from the normal "Synchronization" message for the ith boundary clock, as in any standard PTP slave algorithm.

It should be appreciated that while Synchronization messages and Delay_Response messages are discussed with reference to the PTP protocol, the invention is not limited to systems that implement this standard. The synchronization and delay response messages discussed herein are intended to encompass other message formats and protocols that achieve synchronization in a similar manner. For example, the system and methods described herein apply equally to similar protocols and mechanisms for time synchronization, such as the "Network Time Protocol" (NTP) version 4 and other similar methods.

The nth boundary clock 310 receives the grand clock error 356 from the ith boundary clock 309 and also receives the standard PTP messages 364 from the ith boundary clock. The grand clock error 356 is added to the nth stage clock error 360 and used as the feedback signal 362 to the nth PTP synchronization loop 358. Because the grand clock error signal 356 has been updated at each intervening stage, the final nth boundary clock 310, as well as all other preceding boundary clocks, is essentially locked directly to the grand master 302 itself.

In the embodiments described above, the grand master 302 outputs the initial grand clock error signal 312 as shown in (1). However, in other embodiments, such as those from different manufacturers, the grand master may not support or be configured to output a grand clock error signal. In that case, the first boundary clock should detect this either by checking the message format or through any other mechanism known in the art. The first boundary clock would then simply use its stage clock error as the updated grand clock error 318 and pass it along to the second boundary clock 306. Such an implementation would also fall within the scope and spirit of the present invention.

The calculation of StageClockError(i) shown in (2) is just a simple example. Those of ordinary skill in the art will also recognize other modifications or algorithms in order to mitigate the effect of packet delay variation, and these would also fall within the scope and spirit of the present invention.

Under normal operation of a network in accordance with an embodiment of the present invention, every boundary clock receives, updates, and transmits the grand clock error according to (2) and (3). This makes each boundary clock "invisible" to the others in the sense that any error it introduces is reflected in the grand clock error signal, which can then be taken out through a simple algorithm by the following ordinary or boundary clock. In some embodiments, an individual boundary clock may think that its own stage clock error is unreliable for some reason. In that case, it may choose to simply pass on the received grand clock error rather than updating it with its own stage clock error. When it does so, the error associated with this particular boundary clock will become "visible" to the following boundary clock stages even though the following stages themselves will still be invisible to each other. In other words, the following boundary clocks will incur the error of the visible boundary clock stage and only that boundary clock stage. Once the visible boundary clock has returned to normal operation and starts to pass an updated grand clock error with its own stage clock error included, it will once again become invisible. The downstream clocks will then once again all be locked to the grand master 302. Thus, the disclosed locking configuration and method is effective and stable. While the embodiments described above contemplate that all boundary clocks are "invisible" in the sense described above, other embodiments are also possible in which some boundary clocks are "visible," and such embodiments would also fall within the scope and spirit of the present invention.

In particular, in one embodiment, the processing element within a boundary clock stage includes a time-out unit. The time-out unit is configured to include a memory for storing the grand clock error received from the previous stage, and a time-out counter. The time-out counter is reset to an initial value each time a grand clock error is received from the previous stage. The time-out counter then counts down from the initial value at a fixed rate. The grand clock error saved in the memory will be used for synchronizing that boundary clock stage as long as the time-out counter has not yet reached zero. In other words, the time-out unit ensures that the boundary clock is using a grand clock error signal that is not older than a particular configurable time.

The calculation of GrandClockError(i) shown in (3) is just a simple example. Those of ordinary skill in the art will also recognize other modifications or algorithms in order to achieve a good estimation of the clock error of boundary clock i 309 against the grand master 302, and these would also fall within the scope and spirit of the present invention.

Furthermore, the calculation and transmission of any other type of clock error information between boundary clocks in order to eliminate or reduce the boundary clock error accumulation would also fall within the scope and spirit of the present invention.

In a preferred embodiment, the grand clock error should be transmitted at a rate that is sufficiently fast that the slave locking algorithm works effectively. In other words, the time it takes for the first grand clock error sent by the first stage boundary clock to reach the final stage boundary clock should be small enough that the final boundary clock can lock to and track the grand master correctly based on its slave tracking algorithm. As an example, if the grand clock error is sent out by each boundary clock at a rate of 30 times per second, then the longest time for the first boundary clock's grand clock error to reach the 30$^{th}$ stage is roughly one second. This time lag is short enough for many phase-locked-loop-based PTP slave algorithms. Thus, in principle, the preferred transmission rate of the grand clock error signal will depend on the maximum number of boundary clocks included in the cascaded chain. Although an implementation of 30 stages and a grand clock error rate of 30 Hz was discussed above, other embodiments are possible and would similarly fall within the scope and spirit of the present invention. In particular, embodiments having a first-stage-to-nth-stage delay of other than one second are also possible.

In another preferred embodiment, the grand clock error is maintained with sufficient precision while restricting the total number of bits required to store and transmit it in order to conserve system resources. In one embodiment, the grand clock error is measured in nanoseconds and multiplied by 256. This provides a grand clock error precision of $\frac{1}{256}$ nanoseconds. The total number of bits used to represent the grand clock error is set to 64 bits. In other embodiments, the number of bits can be reduced to 32 or still further. Embodiments having other precision values would also fall within the scope and spirit of the present invention.

In one embodiment, the grand clock error is distributed between boundary clocks as a special additional packet or message. In another embodiment, it may be appended to an existing network message. As one example, within the PTP standard, a TLV extension can be added to the existing "Delay_Response" message and used to convey the grand clock error message. Furthermore, the TLV extension can be transmitted on every "Delay_Response" message or every several "Delay_Response" messages for reduced bandwidth consumption. Other methods of distributing the grand clock error information at a fixed or variable rate are also possible and would fall within the scope and spirit of the present invention.

Several embodiments of an apparatus and method for eliminating wander accumulation in a network are described above. Those of ordinary skill in the art will also recognize other modifications, embodiments, and applications of such a system for improving the precision of distributed timing references, and these would also fall within the scope and spirit of the present invention.

What is claimed is:

1. A clock synchronization system for use in a network comprising a grand master clock, a first clock regenerator, and a second clock regenerator, wherein:

the grand master clock includes a primary precision timing source;

the first clock regenerator is operatively connected to the grand master clock, and to the second clock regenerator, wherein the first clock regenerator includes:

a first local clock; and a first synchronization processing unit for synchronizing the first local clock to the grand master clock and configured to:

receive a first master-to-slave message from the grand master clock;

send a first slave-to-master message to the grand master clock;

calculate a first master-to-slave path delay and a first slave-to-master path delay based at least in part on the first master-to-slave message and the first slave-to-master message;

calculate a first stage clock error equal to one half of a difference between the first slave-to-master path delay and the first master-to-slave path delay;

generate a first grand clock error equal to a sum of the first stage clock error and a grand clock baseline error, wherein the grand clock baseline error is set equal to zero; and synchronize the first local clock to the grand master clock based at least in part on the first stage clock error and the grand clock baseline error;

transmit the first grand clock error to the second clock regenerator; and the second clock regenerator is operatively connected to the first clock regenerator, wherein the second clock regenerator includes:

a second local clock; and a second synchronization processing unit for synchronizing the second local clock to the grand master clock and configured to:

receive a second synchronization message from the first clock regenerator;
receive a second delay response message from the first clock regenerator;
receive and store the first grand clock error from the first clock regenerator;
calculate a second master-to-slave path delay based at least in part on the second synchronization message;
calculate a second slave-to-master path delay based at least in part on the second delay response message;
calculate a second stage clock error equal to one half of a difference between the second slave-to-master path delay and the second master-to-slave path delay;
calculate a second grand clock error equal to a sum of the first grand clock error and the second stage clock error; and
synchronize the second local clock to the grand master clock based at least in part on the second stage clock error and the first grand clock error.

2. The clock synchronization system of claim 1, wherein the grand master clock is further configured to generate the grand clock baseline error and to send the grand clock baseline error to the first clock regenerator.

3. The clock synchronization system of claim 1, wherein the first clock regenerator is further configured to generate the grand clock baseline error.

4. The clock synchronization system of claim 1, wherein the first synchronization processing unit includes a memory element for storing the first grand clock error.

5. The clock synchronization system of claim 1, wherein the first synchronization processing unit is further configured to quantize the first grand clock error to no more than 32 bits.

6. The clock synchronization system of claim 1, wherein the first grand clock error is packaged with the second delay response message for receipt by the second clock regenerator.

7. A clock synchronization system for use in a network having a grand master clock and N clock regenerators, where N is an integer greater than one, comprises:
a first clock regenerator operatively connected to the grand master clock;
a kth clock regenerator, wherein k is an integer between, but not including, 1 and N, comprising:
an operative connection to a (k−1)th clock regenerator;
an operative connection to a (k+1)th clock regenerator;
a synchronization processing unit including:
a kth processing element configured to:
receive a master-to-slave message from the (k−1)th clock regenerator;
send a slave-to-master message to the (k−1)th clock regenerator;
calculate a kth master-to-slave path delay and a kth slave-to-master path delay based at least in part on the master-to-slave message and the slave-to-master message;
calculate a kth stage clock error equal to one half of a difference between the kth slave-to-master path delay and the kth master-to-slave path delay;
receive a (k−1)th grand clock error from the (k−1)th clock regenerator;
calculate a kth grand clock error equal to a sum of the (k−1)th grand clock error and the kth stage clock error;
synchronize the kth clock regenerator to the grand master clock based at least in part on the kth stage clock error and the (k−1)th grand clock error; and
the (k+1)th clock regenerator using at least the kth grand clock error to synchronize the (k+1)th clock regenerator to the grand master clock; and
an Nth clock regenerator operatively connected to an (N−1)th clock regenerator.

8. The clock synchronization system of claim 7, wherein the kth processing element includes a memory element for storing the (k−1)th grand clock error.

9. The clock synchronization system of claim 7, wherein the synchronization processing unit is further configured to quantize the kth grand clock error to no more than 32 bits.

10. The clock synchronization system of claim 7, wherein the kth processing element is further configured to assemble the kth grand clock error and the delay response message to the (k+1)th clock regenerator into a packet such they are sent to the (k+1)th clock regenerator together.

11. The clock synchronization system of claim 7, wherein the kth processing element further includes a rate control unit, configured to selectively control a frequency at which the kth grand clock error is transmitted to the (k+1)th clock regenerator.

12. The clock synchronization system of claim 7, wherein the kth processing element further includes a time-out unit having a memory for storing the (k−1)th grand clock error and a time-out counter that is decremented from an initial value, wherein the time-out unit is configured such that each time the (k−1)th grand clock error is received, the time-out unit is configured to:
update the memory to store the received (k−1)th grand clock error;
reset the time-out counter to the initial value;
use the (k−1)th grand clock error for synchronizing the kth clock regenerator to the grand master clock as long as the time-out counter has not reached zero.

13. In a network comprising a grand master clock and N clock regenerators, where N is an integer greater than 1, a method of synchronizing each of the N clock regenerators to the grand master clock comprises the steps of:
sending a master-to-slave message from the grand master clock to a first clock regenerator;
sending a slave-to-master message from the first clock regenerator to the grand master clock;
at the first clock regenerator, performing the steps of:
calculating a first master-to-slave path delay and a first slave-to-master path delay based at least in part on the master-to-slave message and the slave-to-master message;
calculating a first stage clock error equal to one half of a difference between the first slave-to-master path delay and the first master-to-slave path delay;
generating a first grand clock error equal to a sum of the first stage clock error and a grand clock baseline error, wherein the grand clock baseline error is set equal to zero; and
synchronizing the first clock regenerator to the grand master clock based at least in part on the first stage clock error and the grand clock baseline error;
at a kth clock regenerator, wherein k is an integer greater than 1 and less than N, performing a synchronization process comprising the steps of:
receiving a master-to-slave message from the (k−1)th clock regenerator;

sending a slave-to-master message to the (k−1)th clock regenerator;

receiving and storing a (k−1)th grand clock error from the (k−1)th clock regenerator;

calculating a kth master-to-slave path delay and a kth slave-to-master path delay based at least in part on the master-to-slave message and the slave-to-master message;

calculating a kth stage clock error equal to one half of a difference between the kth slave-to-master path delay and the kth master-to-slave path delay;

calculating a kth grand clock error equal to a sum of the kth stage clock error and the (k−1)th grand clock error; and synchronizing the kth clock regenerator to the grand master clock based at least in part on the kth stage clock error and the (k−1)th grand clock error; and at the Nth clock regenerator, performing the steps of:

receiving a master-to-slave message from the (N−1)th clock regenerator;

sending a slave-to-master message to the (N−1)th clock regenerator;

receiving and storing an (N−1)th grand clock error from the (N−1)th clock regenerator;

calculating an Nth master-to-slave path delay and an Nth master-to-slave path delay based at least in part on the master-to-slave message and the slave-to-master message;

calculating a Nth stage clock error equal to one half of a difference between the Nth slave-to-master path delay and the Nth master-to-slave path delay; and synchronizing the Nth clock regenerator to the grand master clock based at least in part on the Nth stage clock error and the (N−1)th grand clock error.

14. The method of synchronizing each of the N clock regenerators to the grand master clock of claim 13, further comprising, at the kth clock regenerator, the step of packing the kth grand clock error into a message and sending the message to the (k+1)th clock regenerator.

15. The method of claim 14, wherein the step of sending the message to the (k+1)th clock regenerator is performed at a fixed rate.

16. The method of claim 14, wherein the step of sending the message to the (k+1)th clock regenerator is performed at a variable rate.

17. The method of synchronizing each of the N clock regenerators to the grand master clock of claim 13, further comprising the step of configuring the grand master clock to generate the grand clock baseline error and to send the grand clock baseline error to the first clock regenerator.

18. The method of synchronizing each of the N clock regenerators to the grand master clock of claim 13, further comprising the step of generating the grand clock baseline error at the first clock regenerator.

19. The method of synchronizing each of the N clock regenerators to the grand master clock of claim 13, further comprising the step of quantizing the grand clock error at each clock regenerator to no more than 32 bits.

* * * * *